US006758934B2

(12) United States Patent
Singh et al.

(10) Patent No.: US 6,758,934 B2
(45) Date of Patent: Jul. 6, 2004

(54) METHOD AND APPARATUS FOR ADHESIVELY SECURING INK JET PEN COMPONENTS USING THIN FILM ADHESIVES

(75) Inventors: Jeanne Marie Saldanha Singh, Lexington, KY (US); Thomas Lee Smart, Paris, KY (US)

(73) Assignee: Lexmark International, Inc., Lexington, KY (US)

( * ) Notice: Subject to any disclaimer, the term of this patent is extended or adjusted under 35 U.S.C. 154(b) by 0 days.

(21) Appl. No.: 10/305,636

(22) Filed: Nov. 27, 2002

(65) Prior Publication Data

US 2003/0131930 A1 Jul. 17, 2003

Related U.S. Application Data

(63) Continuation of application No. 09/618,123, filed on Jul. 17, 2000, now abandoned.

(51) Int. Cl.[7] ................................................ B32B 31/18

(52) U.S. Cl. ....................... 156/248; 156/249; 156/247; 156/257; 156/267; 156/268

(58) Field of Search ................................ 156/298, 249, 156/234, 268, 267, 257, 269, 270, 329, 330, 297, 313, 306.6, 517, 250, 530, 260, 261, 520

(56) References Cited

U.S. PATENT DOCUMENTS

| | | | | |
|---|---|---|---|---|
| 4,056,881 | A | | 11/1977 | Holt et al. |
| 4,750,962 | A | * | 6/1988 | Haygood et al. ........... 156/249 |
| 4,762,983 | A | | 8/1988 | Oogita et al. |
| 4,776,914 | A | | 10/1988 | Horikiri |
| 4,959,008 | A | | 9/1990 | Wasulko |
| 5,049,434 | A | | 9/1991 | Wasulko |
| 5,160,403 | A | | 11/1992 | Fisher et al. |
| 5,226,993 | A | | 7/1993 | Tukakoshi et al. |
| 5,252,166 | A | | 10/1993 | Krawczyk |
| 5,288,358 | A | | 2/1994 | Logan |
| 5,375,326 | A | | 12/1994 | Usui et al. |
| 5,383,996 | A | | 1/1995 | Dressler |
| 5,514,240 | A | | 5/1996 | Hagiiiri-Teiirani et al. |
| 5,573,621 | A | | 11/1996 | Boreali |
| 5,599,416 | A | | 2/1997 | Kuwahara |
| 5,696,032 | A | | 12/1997 | Phelps, Jr. et al. |
| 5,696,546 | A | | 12/1997 | Narang et al. |
| 6,190,492 | B1 | | 2/2001 | Byrne et al. |

* cited by examiner

*Primary Examiner*—Richard Crispino
*Assistant Examiner*—George R. Koch, III
(74) *Attorney, Agent, or Firm*—Luedeka, Nesly & Graham, P.C.

(57) ABSTRACT

The invention relates to a method for attaching microelectronic devices, circuit boards and the like to a surface, and is particularly suitable for attaching a plurality of a semiconductor chips to an ink jet pen body. The method includes the steps of (a) providing a sheet of a thin film adhesive material having a first surface and a second surface opposite the first surface, the second surface being releasably attached to a carrier web; (b) simultaneously making a plurality of cuts in the sheet of thin film adhesive material, the cuts extending from the first surface to an interface between the second surface and the carrier web without significantly extending into the carrier web to provide one or more cut portions of adhesive film; (c) removing each cut portion of adhesive film from the carrier web; (d) engaging the second surface of each of the cut portions with predetermined locations on a receiving surface; and (e) providing one or more semiconductor chips in a desirably aligned configuration with respect to the predetermined locations and contacting each semiconductor chip with first surface of each of the cut portions. Use of the method and apparatus of the invention provides significant improvement in the application of adhesive films to surfaces in electronic component assembly.

14 Claims, 8 Drawing Sheets

METHOD AND APPARATUS FOR ADHESIVELY SECURING INK JET PEN COMPONENTS USING THIN FILM ADHESIVES

This application is a continuation of application Ser. No. 09/618,123, filed Jul. 17, 2000, now pending.

FIELD OF THE INVENTION

The invention relates to ink jet printers and in particular to methods for assembling ink jet pen components of multi-color pens using thin film adhesives.

BACKGROUND OF THE INVENTION

Ink jet printers are continually undergoing design changes to improve the speed and print quality produced by such printers in order to provide printed images which have the appearance of laser printed media. One important advantage of ink jet printers over that of laser printers is that multi-color images may be produced relatively less expensively than with laser printers. Multicolor images are produced by depositing dots of different colors in precise patterns on the print media. One of the difficulties associated with multi-color printing is that the printheads of the individual ink jet pens used to produce the images must be aligned with each other so that the dot placement errors or minimized. Exact alignment of all critical printhead components during the assembly of an ink jet pen is extremely difficult to achieve. Even if the parts are initially aligned, it is difficult to maintain the alignment throughout the manufacturing process without the use of costly jigs. Even with elaborate alignment equipment, because of the size of the parts, extremely small alignment errors may have a major impact on the performance of the pens in a printer.

The manufacture of a multi-color ink jet is typically a multi-step process. The most common multicolor printer uses individual ink jet pens for each color of ink. The components of the pens including the printheads are aligned and assembled with respect to their pen bodies. The individual pens are then attached to a carriage in side by side relationship. Once the pens are attached to the carriage, the pens may be individually adjusted to provide the desired alignment between the different pen colors. The components of each of the pens are aligned with respect to reference marks on the pen bodies and alignment between the individual color pens is conducted after all of the components of the pens are assembled and attached to the carriage. A disadvantage of this method for aligning the ink jet pens is that multiple alignment steps are required for the individual pens and there is a possibility that misalignment may occur due to wear or damage thereby requiring another costly alignment step.

It is difficult to produce multicolor pens having two or more printheads attached to the same ink jet pen body because of the need to maintain alignment of the pen components. Thin film adhesives have attributes that make them desirable for use in the assembly of ink jet pens. For example, thin film adhesives are available that have substantially uniform thickness. However, such adhesives also have numerous attributes that render them difficult to handle or otherwise work with and thus the use of such adhesives are problematic in a production setting. There is a need therefore for manufacturing techniques and apparatus that facilitate the use of thin film adhesives in the manufacture of ink jet pens.

SUMMARY OF THE INVENTION

With regard to the foregoing, the invention provides a method for attaching microelectronic devices, circuit boards and the like to a surface, and is particularly suitable for attaching a plurality of semiconductor chips to an ink jet pen body. The method includes the steps of (a) providing a sheet of a thin film adhesive material having a first surface and a second surface opposite the first surface, the second surface being releasably attached to a carrier web; (b) simultaneously making a plurality of cuts in the sheet of thin film adhesive material, the cuts extending from the first surface to an interface between the second surface and the carrier web without significantly extending into the carrier web to provide one or more cut portions of adhesive film; (c) removing each cut portion of adhesive film from the carrier web; (d) engaging the second surface of each of the cut portions with predetermined locations on a receiving surface; (e) providing one or more semiconductor chips in a desirably aligned configuration with respect to the predetermined locations and contacting each semiconductor chip with first surface of each of the cut portions; and (f) curing the thin film adhesive in order to substantially bond the chips to the receiving surface.

In another aspect, the invention relates to apparatus for simultaneously cutting two or more strips of thin film adhesive and thereafter simultaneously applying the plurality of strips of thin film adhesive to a component of an ink jet pen in the manufacture of the ink jet pen.

In a preferred embodiment, the apparatus includes a plurality of cutting/application assemblies desirably aligned with one another and spaced apart from one another a predetermined distance corresponding to desired application positions of the strips of thin film adhesive to an ink jet pen. A plurality of shafts capable of reciprocating movement relative to the cutting/application assemblies are provided, one each operatively associated with one of the cutting/application assemblies. A control assembly is provided for controlling movement of the shafts and for movably positioning the cutting/application assemblies relative to a workpiece such as a sheet of adhesive or an ink jet pen component. A plurality of rigid connecting members are provided for connecting each cutting/application member to the control assembly.

Each of the cutting/application assemblies includes a stamping die having a perimeter defining a surface thereof of suitable configuration for cutting portions of thin film adhesive of a predetermined configuration from a sheet of thin film adhesive. An insert is movably positionable within a portion of the stamping die adjacent to the perimeter and has a surface suitable for receiving a cut portion of the thin film adhesive. Each of the shafts is operatively associated with one of the inserts and the control assembly.

The invention advantageously facilitates the handling of thin film adhesives in the manufacture of microelectronic devices, such as ink jet pens. The invention provides conveniences in the cutting and application of thin film adhesives so that precisely cut portions of film material may be cut and accurately placed without undue handling thereof and without subjecting the film material to handling procedures that promote damage to the materials.

BRIEF DESCRIPTION OF THE DRAWINGS

Further advantages of the invention will become apparent by reference to the detailed description when considered in conjunction with the figures, which are not to scale, wherein like reference numbers indicate like elements through the several views, and wherein.

DETAILED DESCRIPTION OF THE INVENTION

The invention relates to methods and apparatus for preparing, handling and installing thin film adhesives in the manufacture of microelectronic devices. The invention is particularly suitable for use in the attachment of semiconductor chips in the manufacture of ink jet pens. Accordingly, in accordance with a preferred embodiment, the invention will be described herein in the context of securing semiconductor chips in the manufacture of ink jet pens. However, it will be understood that the invention is suitable in other applications involving adhesive securement of components in the manufacture of microelectronic devices.

Figure 1:
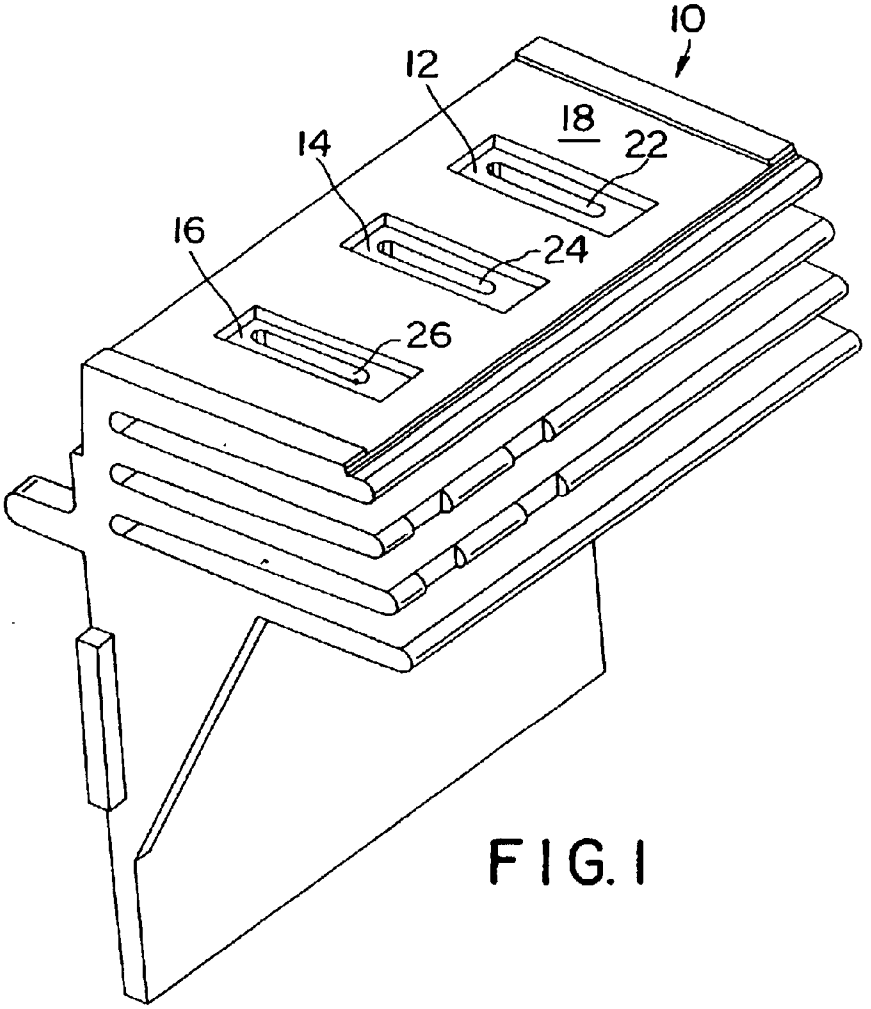
FIG. 1 is a perspective view of a multicolor ink jet pen body showing semiconductor chip pockets therein.
Figure 2:
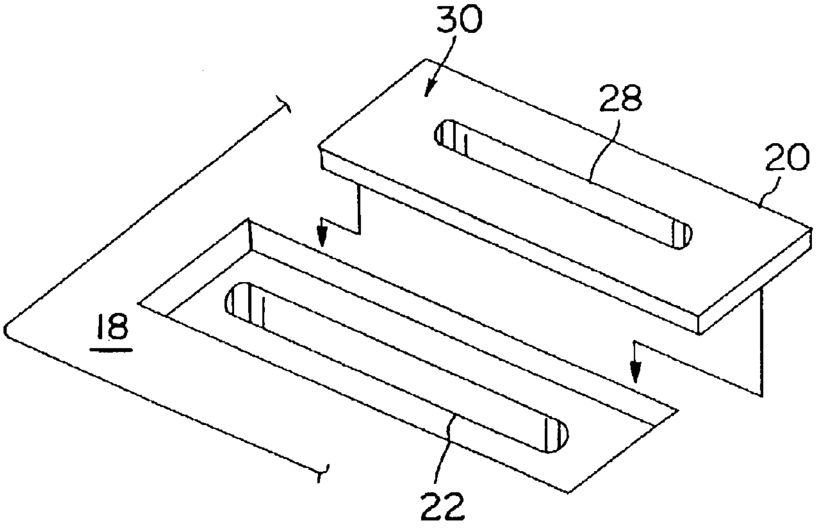
FIG. 2 is a perspective view of a single chip pocket and semiconductor chip for placement therein.

With reference to FIGS. 1 and 2 there is shown in perspective view an ink jet pen body 10, preferably a multicolor ink jet body, containing chip pockets 12, 14 and 16 on a first surface 18 thereof for the colors cyan, magenta and yellow. In the alternative, the pen body 10 may contain from two to four chip pockets. Preferably, the pen body 10 contains from three or four chip pockets, the fourth chip pocket being adapted for the color black.

The chip pockets 12, 14 and 16 are recessed from the first surface 18 so that semiconductor chips 20 positioned in the pockets 12–16 do not extend above the top surface 18 of the pen body 10. Each of the chip pockets 12, 14 and 16 contains an ink feed slot substantially in the center thereof, such as slots 22, 24 and 26, for feed of ink to the chips 20 when they are mounted in the chip pockets 12–16. The semiconductor chips 20 each contain an ink via 28 therein for ink flow communication between ink in the ink feed slots and a top surface 30 of the chips 20. The chips 20 contain energy imparting devices such as resistor heaters or piezoelectric devices which upon activation cause ink to be ejected through orifice holes in a nozzle plate attached to the top surface 30 of the semiconductor chip 20. The slots/chips are shown configured for feeding ink through the center of the chips. However, it will be understood that the invention is equally applicable for use with ink pens of the type wherein ink is fed around the edges or sides of the semiconductor chips 20 from ink feed slots offset from the center of the chip pockets 12, 14 and 16. In an edge feed design, since ink flows around the edges of the chips 20, the chips do not contain ink vias 28.

A nozzle plate, preferably a separate plastic or metal member, may be adhesively attached to the semiconductor chip 20 through a window or opening in a flexible circuit or TAB circuit. Alternatively, the nozzle plate may be integral with a flexible circuit or TAB circuit. The adhesive used to attach the nozzle plate to the semiconductor chip 20 may be a heat curable adhesive such a B-stageable thermal cure resin, including, but not limited to phenolic resins, resorcinol resins, epoxy resins, ethylene-urea resins, furane, resins, polyurethane resins and silicone resins. The adhesive between the nozzle plate and chip 20 is preferably cured before attaching the chip 20 to the chip pocket 12 of the pen body 10 and preferably has a thickness ranging from about 1 to about 25 microns.

The flexible circuit or TAB circuit, which may be separate or integral with the nozzle plate, contains electrical traces and contacts for electrically connecting the energy imparting devices on the top surface 30 of the chip 20 with a printer control system. The design and manufacture of nozzle plates and flexible circuits or TAB circuits and attachment of the nozzle plates to a semiconductor chip are well known in the art and are described, for example in U.S. Pat. No. 5,305,015 to Schantz et al., the disclosure of which is incorporated by reference as if fully set forth herein.

Because of the design of an ink jet pen having a pen body 10 containing two or more semiconductor chips 20 attached in chip pockets 12, 14 and 16 on the pen body 10, each of the chips 20 must be precisely aligned with respect to one another and with respect to the nozzle plate during the assembly process. Misalignment may cause improper ink dot placement with respect to one or more colors being printed.

Figure 3:
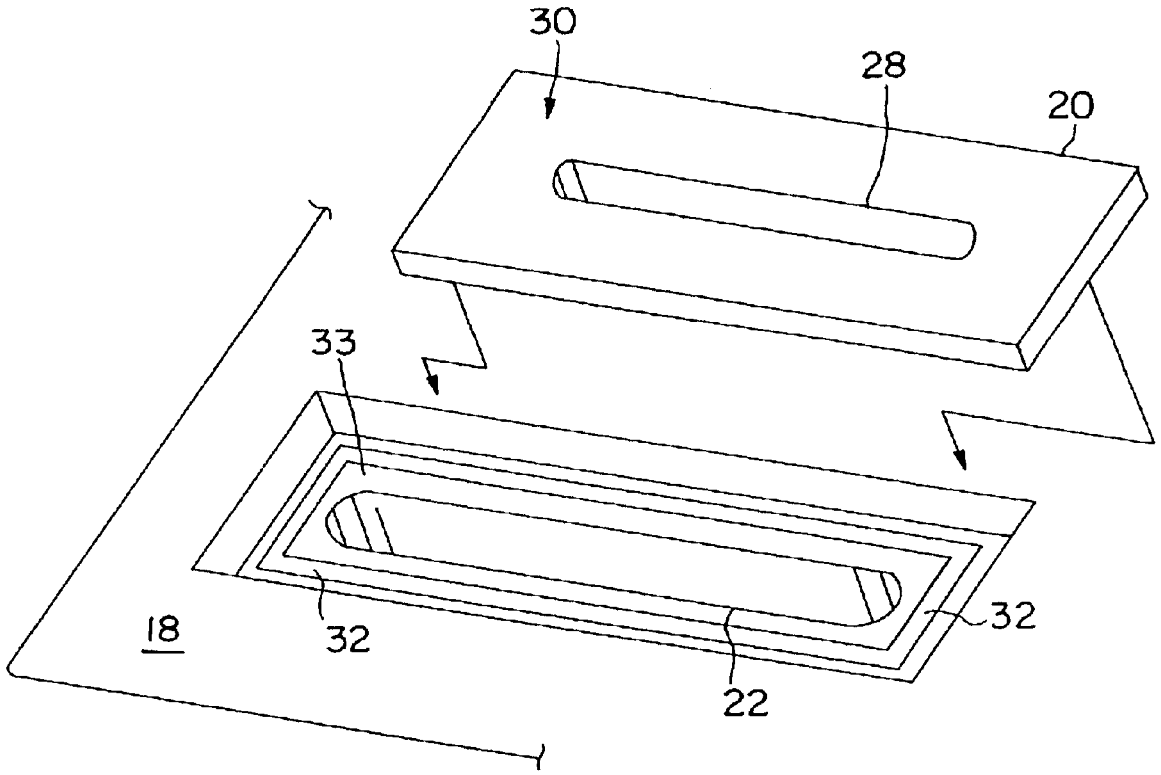
FIG. 3 is a perspective view of adhesive placement relative to a semiconductor chip and chip pocket according to the invention and FIG. 3*a* shows a perspective view of an alternate adhesive placement.

With reference to FIG. 3, a thin film adhesive in film or paste form, may be used to fixedly attach each chip 20 in one of the chip pockets 12-16. Preferred thin film adhesives include epoxy, cyanate ester and cyanate ester/epoxy adhesives having a thickness ranging from about 0.0005 to about 0.006 inch. Particularly preferred adhesives are available from Bryte Technologies, Inc. of Morgan Hill, Calif. under the trade name BRYTE EX-1522U and from Ablestik Electronic Materials & Adhesives, a subsidiary of National Starch and Chemical Company of Rancho Dominiguez, Calif. under the trade names ABLESTIK 550 and ABLESTIK 561.

Figure 3A:
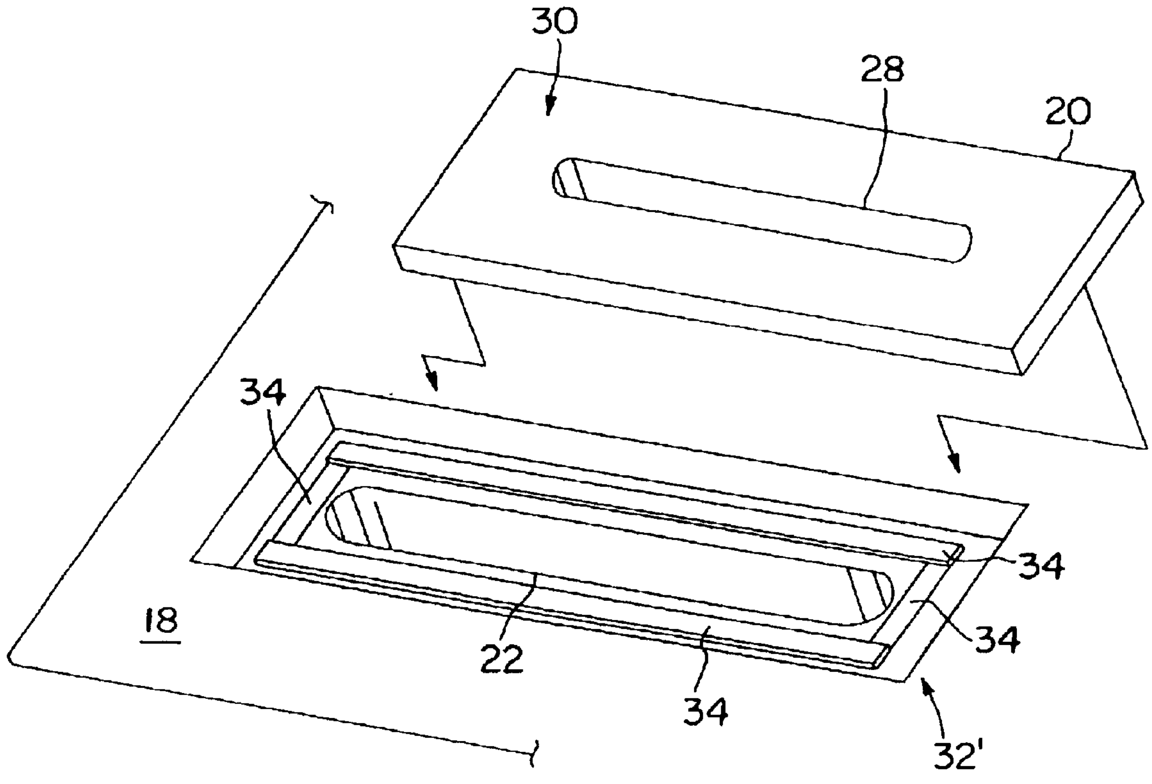

In the case of a center feed chip design for an ink jet pen 10, the adhesive is preferably provided as a substantially continuous frame 32 having an opening 33, the frame 32 surrounding or circumscribing slot 22. In an alternate embodiment (FIG. 3*a*), a frame 32' consisting of a plurality of individual strips or segments 34 is positioned to fully or partially encircle slot 22. The adhesive frame 32 (or 32') provides a surface on a first side for adhering to the chip cavity and a surface on a second side opposite the first side for adhering to the chip. In the case of an edge feed chip design for an ink jet pen 10, the adhesive preferably has a substantially continuous solid rectangular configuration rather than being provided as a frame 32 or strips 34.

Figure 4:
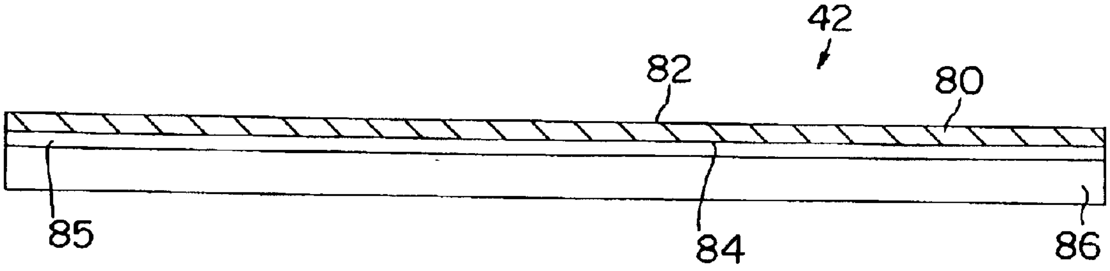
FIG. 4 is a cross-sectional side view of a sheet adhesive for use in accordance with the invention.

The adhesive frame 34, strips 34 or rectangle are cut from an adhesive sheet 42 illustrated in FIG. 4. The adhesive sheet 42 includes an adhesive film 80 having a first surface 82 and a second surface 84 opposite the first surface 82. The adhesive sheet 42 may be tacky or a low tack adhesive may be applied to a release liner or carrier web 86 for attaching the second surface 84 of the adhesive film 80 thereto. The adhesive film 80 preferably has a thickness preferably ranging from about 0.0005 to about 0.006 inch. The release liner or carrier web 86 is preferably substantially thicker than the adhesive film 80 and preferably has a thickness ranging from about 0.01 to about 0.1 inch. As will be appreciated, the release liner or carrier web 86 may be a coated paper or plastic material, which may or may not contain a low tack adhesive layer 85 for attaching the web 86 to an adhesive film 80. In the case of a non-tacky adhesive film 80, the frame 32 or strips 34 are simply laid in the chip pockets 12, 14 and 16 before placing the chips 20 in the chip/nozzle plate assembly in the chip pockets 12, 14 and 16.

Once the chip/nozzle plate assembly is attached to the pen body 10, a flexible circuit or TAB circuit may be attached to the top surface 18 of the pen body 10 using a heat activated or pressure sensitive adhesive. Preferred adhesives include, but are not limited to phenolic butyral adhesives, acrylic based pressure sensitive adhesives such as AEROSET 1848 available from Ashland Chemicals of Ashland, Ky. and phenolic blend adhesives such as SCOTCH WELD 583 available from 3M Corporation of St. Paul, Minn. The adhesive thickness preferably ranges from about 0.001 to about to about 0.005 inch.

Turning to FIGS. 5–8, there is shown apparatus 40 for simultaneously depositing frames 32 or strips 34 of adhesive onto the surfaces 36, 37 and 38 of the chip pockets 12–16 of the ink jet pen. The apparatus 40 includes a plurality of assemblies 44, 46 and 48. The assemblies 44–48 are aligned with one another and spaced apart from one another corresponding to the locations of the chip pockets 1216. As explained below, the assemblies 44–48 are suitable for positioning the adhesive frames 32 or strips 34 in the chip pockets 12–16, such as to surround the slot 22 of chip pocket 12. The apparatus 40 may also be used to apply a rectangular adhesive film to the surfaces 36, 37 and 38 of chip pockets 12–16.

The assemblies 44–48 are operatively associated in the manner described below with shafts 50, 52 and 54, respectively, mounted on a motorized control assembly 56 for simultaneous operation of the assemblies 44–48. Each assembly 44–48 is rigidly connected to the control assembly 56 as by rigid connecting members 58 extending between the assemblies 44–48 and the control assembly 56.

The control assembly 56 may be of any suitable construction for controlled simultaneous movement of the shafts 50–54 of the assemblies 44–48. For example, the control assembly 56 may be mounted to a motor driven, variably positionable support capable of controlled movement towards and away from a work surface, it being understood that the assemblies 44–48 move in unison with the control assembly 56 by virtue of the connecting members. In addition, the control assembly 56 contains internal mechanical structure for simultaneous controlled movement of the shafts 50–54 either toward or away from the work surface. The structure of a suitable control assembly 56 is considered to be well within the knowledge of one of ordinary skill in the art.

The assemblies 44–48 are preferably identical to one another. Accordingly, only the construction and operation of assembly 44 will be described in detail, and the description applies to the remaining assemblies which are substantially identical thereto.

Figure 6:
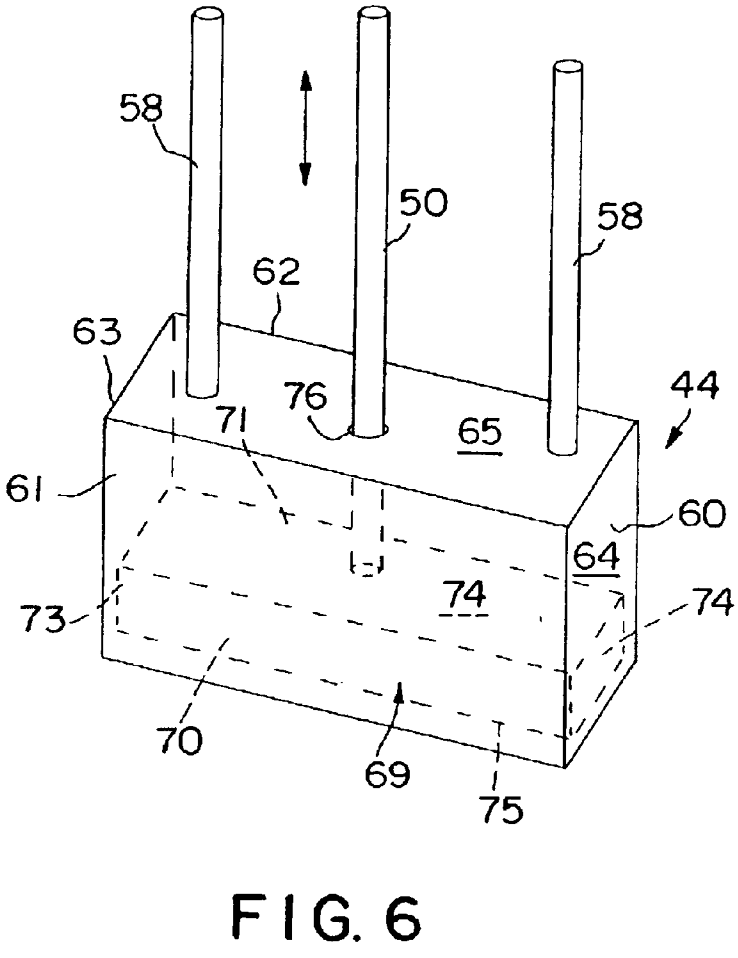
FIG. 6 is a perspective view showing a portion of the apparatus of FIG. 5.
Figure 5:
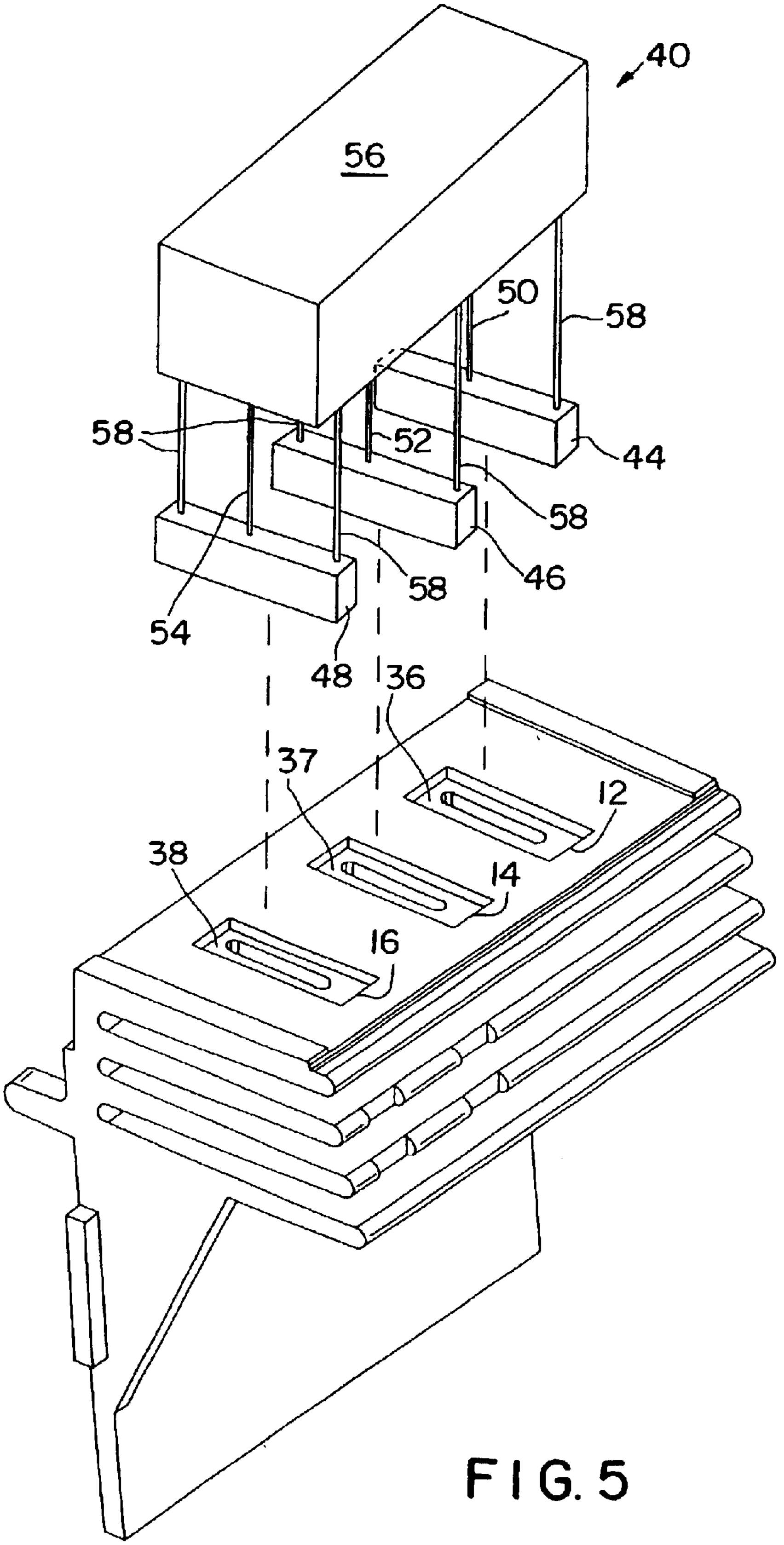
FIG. 5 is a perspective view of apparatus for simultaneously placing adhesive in a plurality of chip pockets.
Figure 7:
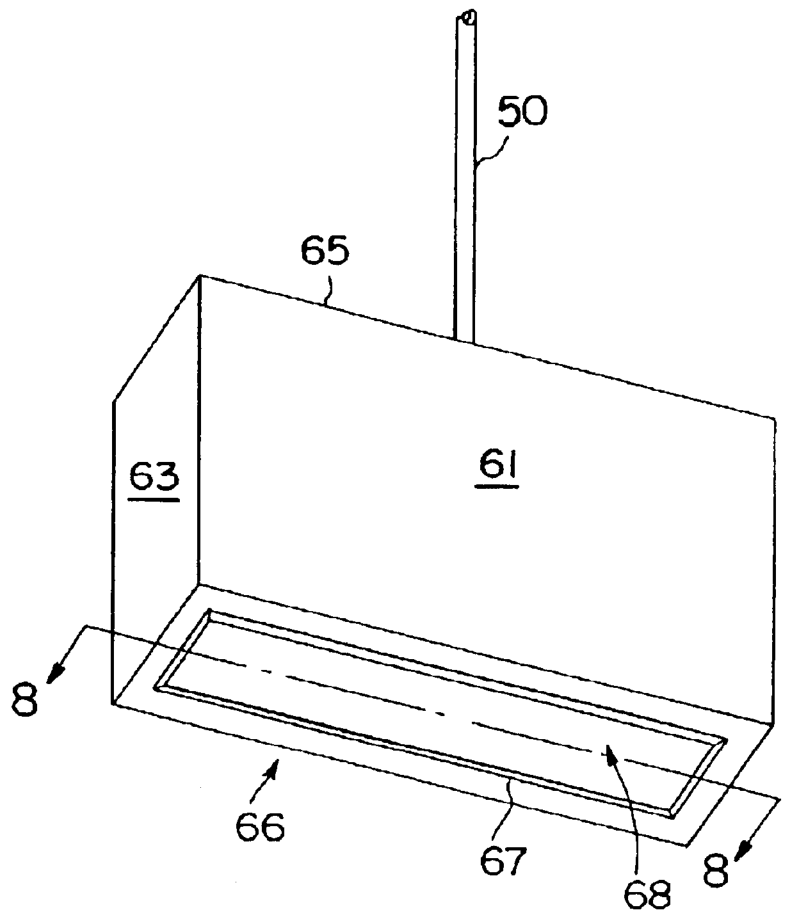
FIG. 7 is a bottom perspective view of the apparatus portion of FIG. 6.
Figure 8:
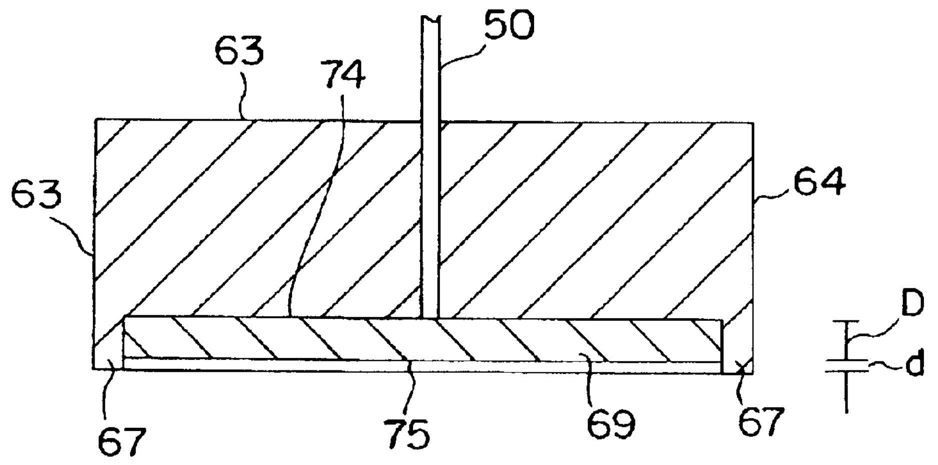
FIG. 8 is a cross-sectional side view taken along lines 8—8 of FIG. 7.

As shown in FIGS. 6–8, the assembly 44 includes a substantially rectangular stamping die 60 having substantially continuous side surfaces 61 and 62, end surfaces 63 and 64, and top surface 65. A bottom 66 of the die 60 has a substantially continuous perimeter 67 surrounding a rectangular blind bore 68 and provides a suitable cutting surface for cutting the frame 32 or rectangular portions from the adhesive film 80, as explained in more detail below. The assembly 44 is preferably constructed of aluminum or a rigid, strong, corrosion resistant material such as stainless steel.

The blind bore 68 is sized to slidably receive a substantially rectangular and solid insert 69 having sides 70 and 71, ends 72 and 73, top 74 and bottom 75, with depth D of the bore 68 being sufficient to receive both the insert 69 and the adhesive cut from film 80. Accordingly, when the insert 69 is fully retracted within the bore 68, the bottom 75 of the insert 69 is withdrawn a distance d within the bore corresponding to the thickness of the adhesive film 80. The die 60 further includes a bore 76 substantially centrally located on the top surface 65 and extending into the bore 68 for slidably receiving the shaft 50. A lowermost end of the shaft 50 is attached to the top 74 of the insert 69.

A separate die, similar to the die described above may be used to cut the rectangular openings 33 for frame 32 prior to cutting frame 32 from the adhesive film 80. In the case of a rectangular adhesive film for an edge feed ink jet pen, only one die 60 as described above is required to cut the adhesive film.

Figure 9A:
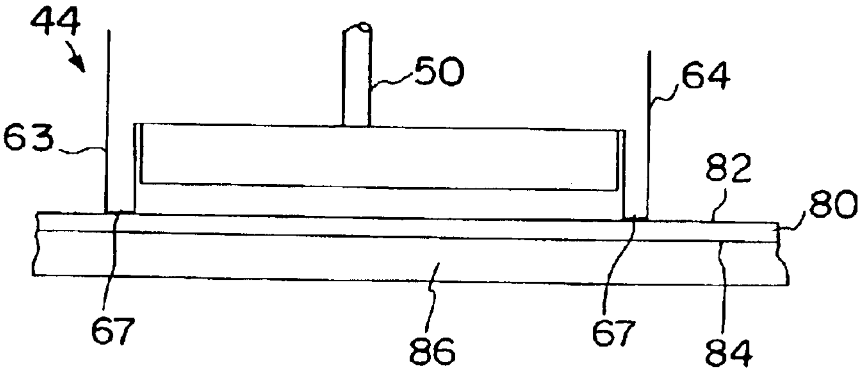
FIGS. 9*a*–9*c* are representational side views showing steps in accordance with invention for obtaining an adhesive strip for positioning in the chip cavity.

With reference to FIG. 9*a*, the initial step in preparation of one of the frames 32, strips 34 or rectangular film is to remove a liner (if provided) from the upper surface 82 of the adhesive film 80 and position the assembly 44 so that the perimeter 67 of the assembly 44 rests on the upper surface 82, it being understood that the adhesive sheet 42 is supported by a suitable work surface, with the carrier web 86 resting on the work surface. The shaft 50 is preferably positioned so that the insert 69 is fully retracted within the bore 68 to provide clearance for the adhesive as it is cut from the adhesive film 80 by downward urging of the perimeter 67.

Figure 9B:
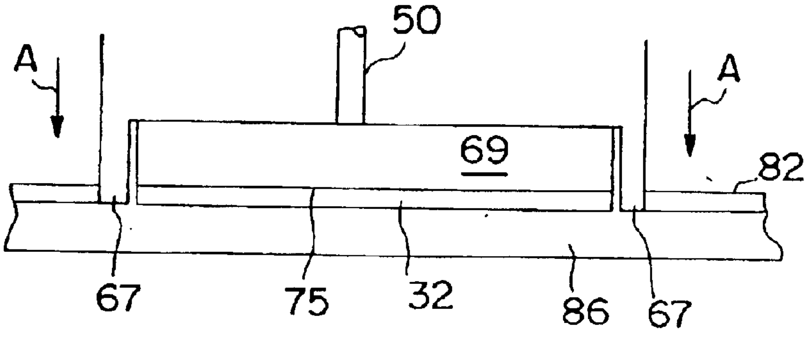
Figure 9C:
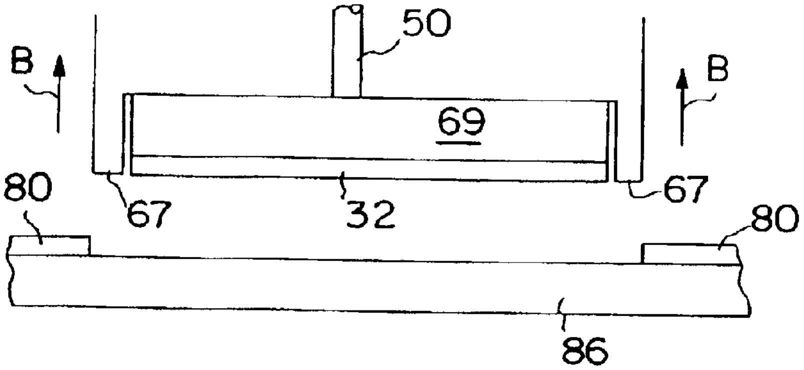

Next (FIG. 9*b*), the assembly 44 is pressed substantially perpendicularly in the direction of the arrows A into the adhesive sheet 42 so that the perimeter 67 cuts through the adhesive film 80 but does not cut into the carrier web 86 or only cuts into the carrier web 86 a minor amount. This renders a cut portion of adhesive corresponding to frame 32, strips 34 or a rectangular adhesive film, and indicated in FIG. 9*b* using reference numeral 32. In the case of frame 32, similar die to die 60 is used to first cut the rectangular opening 33 in frame 32 before cutting the frame 32 from adhesive sheet 42. The resulting frame 32 or rectangular adhesive film cut from the adhesive sheet 42 remains with the assembly 44 as the assembly 44 is removed from the sheet 42 by pulling it away from the sheet 42 in the direction of the arrows B. As the assembly 44 is withdrawn from sheet 42, the carrier web 86 is separated from the adhesive film 80. Throughout the steps represented by FIGS. 9*a*–9*c*, the shaft 50 is preferably maintained such that the insert 69 is fully withdrawn into the bore 38.

Figure 10A:
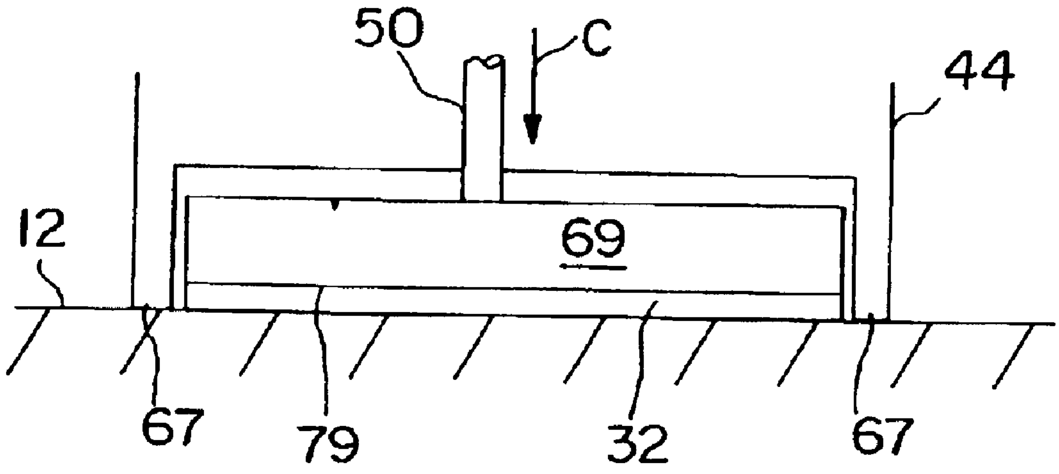
FIGS. 10*a*–10*b* are representational side views showing steps in accordance with the invention for positioning adhesive strips in a chip cavity.
Figure 10B:
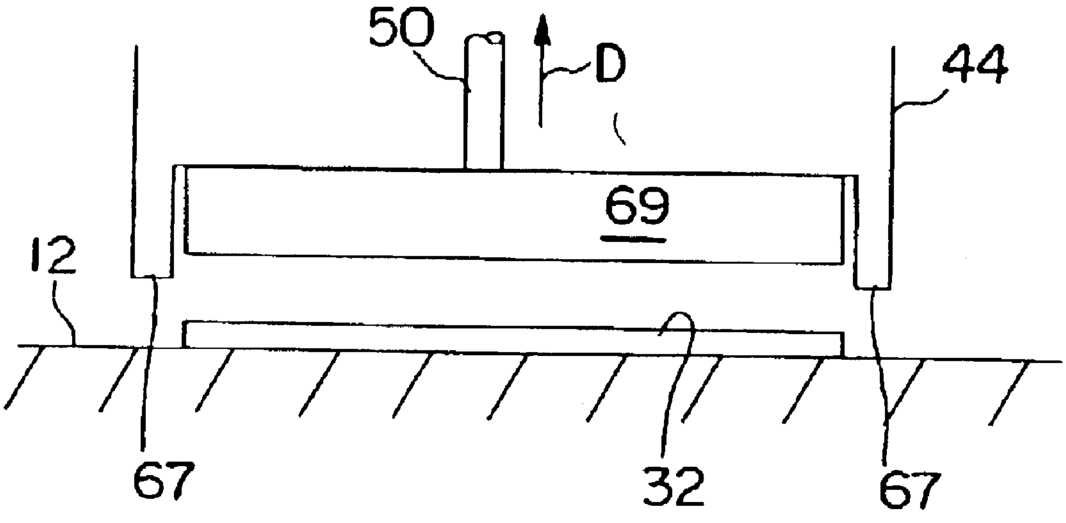

As shown in FIGS. 10*a*–10*b*, the frame 32 or rectangular adhesive film is installed within the chip pocket 12 by first positioning the assembly 44 adjacent chip pocket 12 (and the other assemblies 46 and 48 being similarly positioned adjacent their respective chip pockets 14 and 16) placing the perimeter 67 of the assembly 44 against the surface 36 of the chip pocket 12 and moving the shaft 50 downwardly in the direction of the arrow C thereby urging insert 69 toward the surface 36 of chip pocket 12 and to bear the surface 84 of the adhesive strip 32 against the chip pocket. As the pressure is exerted on the frame 32 via the shaft 50, the frame 32 is urged toward surface 36 of the chip pocket 12. While not required, surface 84 or surface 36 may contain a low-tack adhesive layer far use in attaching frame 32 to the chip pocket 12. The shaft 50 is then moved in to direction D away from the chip pocket and the frame 32 releases from the surface 75 of the insert 60 and remain in to chip pocket 12. The assembly 44 is thereafter or simultaneously withdrawn from the chip pocket 12.

To facilitate separation of frame 32 from the insert 69, it is preferred that the surface 75 of the insert 69 have less affinity for the adhesive film 80 as compared to the surface 36 of the chip pocket 12, but still sufficient adhesion for removing the frame 32 from the material sheet 42. This may be accomplished, for example, by coating the surface 75 with a low surface energy coating such as a polytetrafluoroethylene coating (PTFE) having a surface energy substantially lower than the surface energy of the surface 36 of the chip pocket 12. In order to increase the surface energy of surface 36, a low-tack adhesive layer may be used in the chip pocket 12. The low tack adhesive should have sufficient tackiness to adhesively secure the frame 32 to the surface 36 of the chip pocket 12 while enabling release of surface 82 of the frame from surface 75 of insert 69.

In a preferred fabrication method for an ink jet pen according to the invention, nozzle plates are bonded to semiconductor chips such as chip 20 using well known bonding techniques. The nozzle plate/chip assemblies are then electrically connected to a flexible circuit or TAB circuit. In a separate step, a thermoplastic adhesive is applied to the top surface 18 of the pen body 10.

Next, the frames 32 are positioned in the chip pockets 12 of the pen body 10 using the apparatus of FIG. 4 in the manner described above in connection with FIGS. 9*a*–9*c* and 10*a*–10*b*. The nozzle plate/chip/circuit assemblies are then aligned to one another and attached to the pen body 10 by positioning them in their aligned orientation within the chip pockets 12 and pressing them in this orientation against the installed frames to maintain them in the chip pockets in their aligned orientation.

Finally, the flexible circuits or TAB circuits are heat staked into the thennoplastic adhesive on the surface 18 of the pen body 10 and heat is applied to the exposed surface of the flexible circuits in an amount sufficient to cause the thermoplastic adhesive to flow and encapsulate the edges of the flexible circuits. A preferred thermoplastic adhesive for attaching the flexible circuits or TAB circuits is a flexible polyolefin, non-curing thermoplastic bonding film such as available from Minnesota Mining and Manufacturing Company of Saint Paul, Minn. under the trade name 3M THERMO-BOND 845. Such film has a thickness ranging from about 0.002 to about 0.005 inch and includes a polyolefin based-resin having a softening i s point in the range of from about 80° to about 150° C.

As will be appreciated, the invention advantageously enables improved manufacture of ink jet pens using thin film adhesives. Multiple portions of thin film adhesive can be prepared simultaneously and applied simultaneously in the manufacture of ink jet pens, avoiding many of the shortcomings of prior methods and apparatus and the problems inherent in the handling of thin film adhesives.

Having described various aspects and embodiments of the invention and several advantages thereof, it will be recognized by those of ordinary skills that the invention is susceptible to various modifications, substitutions and revisions within the spirit and scope of the appended claims.

What is claimed is:

1. A method for attaching microelectronic devices to a receiving surface, the method comprising the steps of (a) providing a sheet of a thin film adhesive material having a first adhesive surface and a second adhesive surface opposite the first adhesive surface, the second adhesive surface being releasably attached to a carrier web, (b) providing a unitary cutting/application device with a movable engagement member having an adhesive affinity for the first adhesive surface, and pressing the unitary cutting/application device against the first adhesive surface to simultaneously make a plurality of cuts in the sheet of thin film adhesive material and to adhere the first adhesive surface to the engagement member, the cuts extending from the first adhesive surface to an interface between the second adhesive surface and the carrier web without significantly extending into the carrier web to provide one or more cut portions of adhesive film; (c) removing the cutting/application device from the sheet of thin film adhesive material wherein each cut portion of adhesive film is removed from the carrier web and remains adhesively attached to the engagement member of the cutting/application device; (d) engaging the second adhesive surface of each of the cut portions with predetermined locations on a receiving surface having an adhesive affinity for the second adhesive surface that is greater than the adhesive affinity of the engagement member for the first adhesive surface using the cutting/application device by urging the engagement member to press the second adhesive surface of the cut portions against the receiving surface and thereafter withdrawing the engagement member away from the receiving surface such that the second adhesive surface remains adhesively secured to the receiving surface while the first adhesive surface separates from the engagement member; (e) providing one or more microelectronic devices in a desirably aligned configuration with respect to the predetermined locations and contacting each of the microelectronic devices with the first adhesive surface of each of the cut portions to adhesively secure the microelectronic devices to the first adhesive surface of the cut portions; and (f) curing the adhesive in order to substantially bond the devices to the receiving surface.

2. The method of claim 1, wherein the thin film adhesive material comprises an adhesive material selected from the group consisting of epoxies, cynates esters, cynate ester/epoxy blends, and silicones.

3. The method of claim 1, wherein the thin film adhesive material has a substantially uniform thickness of from about 0.0005 to about 0.006 inch.

4. The method of claim 1, wherein the predetermined locations comprise surfaces of chip pockets of an ink jet pen.

5. The method of claim 1, wherein the step of engaging the second adhesive surface of the cut portions with predetermined locations on a receiving surface comprises providing one or more engagement members and urging a surface of each engagement member having an affinity for the cut portions against the first adhesive surface of each of the cut portions.

6. A method for attaching a plurality of a semiconductor chips to an ink jet pen body which comprises the steps of(a) providing a sheet of a thin film adhesive material having a first adhesive surface opposite a second adhesive surface and a carrier web releasably attached to the second adhesive surface using a low tack adhesive, (b) providing a unitary cutting/application device with a movable engagement member having an adhesive affinity for the first adhesive surface, and pressing the unitary cutting/anplication device against the first adhesive surface to simultaneously make a plurality of cuts in the sheet of thin film adhesive material and to adhere the first adhesive surface to the engagement member, the cuts extending from the first adhesive surface to an interface between the second adhesive surface and the carrier web without significantly extending into the release carrier web to provide one or more cut portions of adhesive film; (c) simultaneously removing the cutting/application device from the sheet of thin film adhesive material wherein each cut portion of adhesive film is removed from the carrier web and remains adhesively attached to the engagement member of the cutting/application device; (d) simultaneously engaging the second adhesive surface of each of the cut portions with predetermined locations on the ink jet pen body having an adhesive affinity for the second adhesive surface that is greater than the adhesive affinity of the engagement member for the first adhesive surface using the cutting/application device by urging the engagement member to press the second adhesive surface of the cut portions against the predetermined locations and thereafter withdrawing the engagement member away from the predetermined locations such that the second adhesive surface of the cut portions remains adhesively secured to the predetermined locations while the first adhesive surface of the cut portions separates from the engagement member; and (e) providing a plurality of semiconductor chips in a desirably aligned configuration with respect to the predetermined locations and substantially simultaneously contacting each semiconductor chip with the first adhesive surface of each of the cut portions to adhesively secure the semiconductor chips to the first adhesive surface of the cut portions.

7. The method of claim 6 wherein the cut portions comprise an adhesive film selected from the group consisting of epoxies, cynates esters, cynate ester/epoxy blends, and silicones.

8. The method of claim 6 wherein the cut portions have a substantially uniform thickness of from about 0.0005 to about 0.006 inch.

9. The method of claim 6 wherein the carrier web comprises a low-tack adhesive layer for releasably engaging the cut portions of the film material thereto.

10. The method of claim 6 further comprising curing the cut portions in order to adhesively bond the chips to the ink jet pen body.

11. A method for attaching one or more components of a microelectronic device to a portion of the microelectronic device during construction thereof, the method comprising the steps of(a) providing a sheet of a thin film adhesive material having a first adhesive surface opposite a second adhesive surface and a carrier web releasably attached adjacent the second adhesive surface, (b) providing a unitary cutting/application device with a movable engagement member having an adhesive affinity for the first adhesive surface, and pressing the unitary cutting/application device aaainst the first adhesive surface to make a plurality of cuts in the sheet of thin film adhesive material and to adhere the first adhesive surface to the engagement member, the cuts extending from the first adhesive surface to an interface between the second adhesive surface and the carrier web without significantly extending into the carrier web to provide one or more cut portions of adhesive film; (c) removing the cutting/application device from the sheet of thin film adhesive material wherein each cut portion of film is removed from the carrier web and remains adhesively attached to the engagement member of the cutting/application device; (d) engaging the second adhesive surface of each of the cut portions with predetermined locations on the microelectronic device having an adhesive affinity for the second adhesive surface that is greater than the adhesive affinity of the engagement member for the first adhesive surface using the cutting/application device by urging the engagement member to press the second adhesive surface of the cut portions against the predetermined locations and thereafter withdrawing the engagement member away from the predetermined locations such that the second adhesive surface of the cut portions remains adhesively secured to the predetermined locations while the first adhesive surface separates from the engagement member; (e) contacting one or more microelectronic components with the first adhesive surface of the cut portions to adhesively secure the microelectronic components to the first adhesive surface of the cut portions; and (f) curing the cut portions in order to bond the one or more components to the microelectronic device.

12. The method of claim 11, wherein the thin film adhesive material comprises an adhesive material selected from the group consisting of epoxies, cynates esters and cynate ester/epoxy blends and silicones.

13. The method of claim 11, wherein the thin film adhesive has a substantially uniform thickness of from about 0.0005 to about 0.006 inch.

14. The method of claim 11, wherein the step of engaging the second surface of each of the cut portions with predetermined locations on a receiving surface comprises providing one or more engagement members and pressing a surface of each engagement member having an affinity for the cut portions against the first surface of each of the cut portions.

* * * * *

UNITED STATES PATENT AND TRADEMARK OFFICE

CERTIFICATE OF CORRECTION

PATENT NO. : 6,758,934 B2
DATED : July 6, 2004
INVENTOR(S) : Jeanne Marie Saldanha Singh et al.

It is certified that error appears in the above-identified patent and that said Letters Patent is hereby corrected as shown below:

<u>Column 8,</u>
Line 58, delete "a" between "of" and "semiconductor"
Line 66, replace "anplication" with -- application --.

<u>Column 10,</u>
Line 5, replace "aaainst" with -- against --.

Signed and Sealed this

Tenth Day of May, 2005

JON W. DUDAS
*Director of the United States Patent and Trademark Office*